Jan. 20, 1959     R. D. HICKOK, JR     2,870,400

TUBE TESTER

Filed Feb. 11, 1955     6 Sheets—Sheet 1

INVENTOR.
ROBERT D. HICKOK, JR.
BY Hudson, Broughton,
Williams, David & Hoffmann
ATTORNEYS Jan. 20, 1959  R. D. HICKOK, JR  2,870,400
TUBE TESTER Filed Feb. 11, 1955  6 Sheets-Sheet 2

INVENTOR.
ROBERT D. HICKOK, JR.
BY Hudson, Boughton,
Williams, David & Hoffmann
ATTORNEYS Jan. 20, 1959

R. D. HICKOK, JR 2,870,400

TUBE TESTER

Filed Feb. 11, 1955

INVENTOR.
ROBERT D. HICKOK, JR.
BY Hudson, Boughton,
Williams, David & Hoffmann
ATTORNEYS Jan. 20, 1959  R. D. HICKOK, JR  2,870,400
TUBE TESTER
Filed Feb. 11, 1955  6 Sheets-Sheet 4

INVENTOR.
ROBERT D. HICKOK, JR.
BY Hudson, Boughton,
Williams, David & Hoffmann
ATTORNEYS

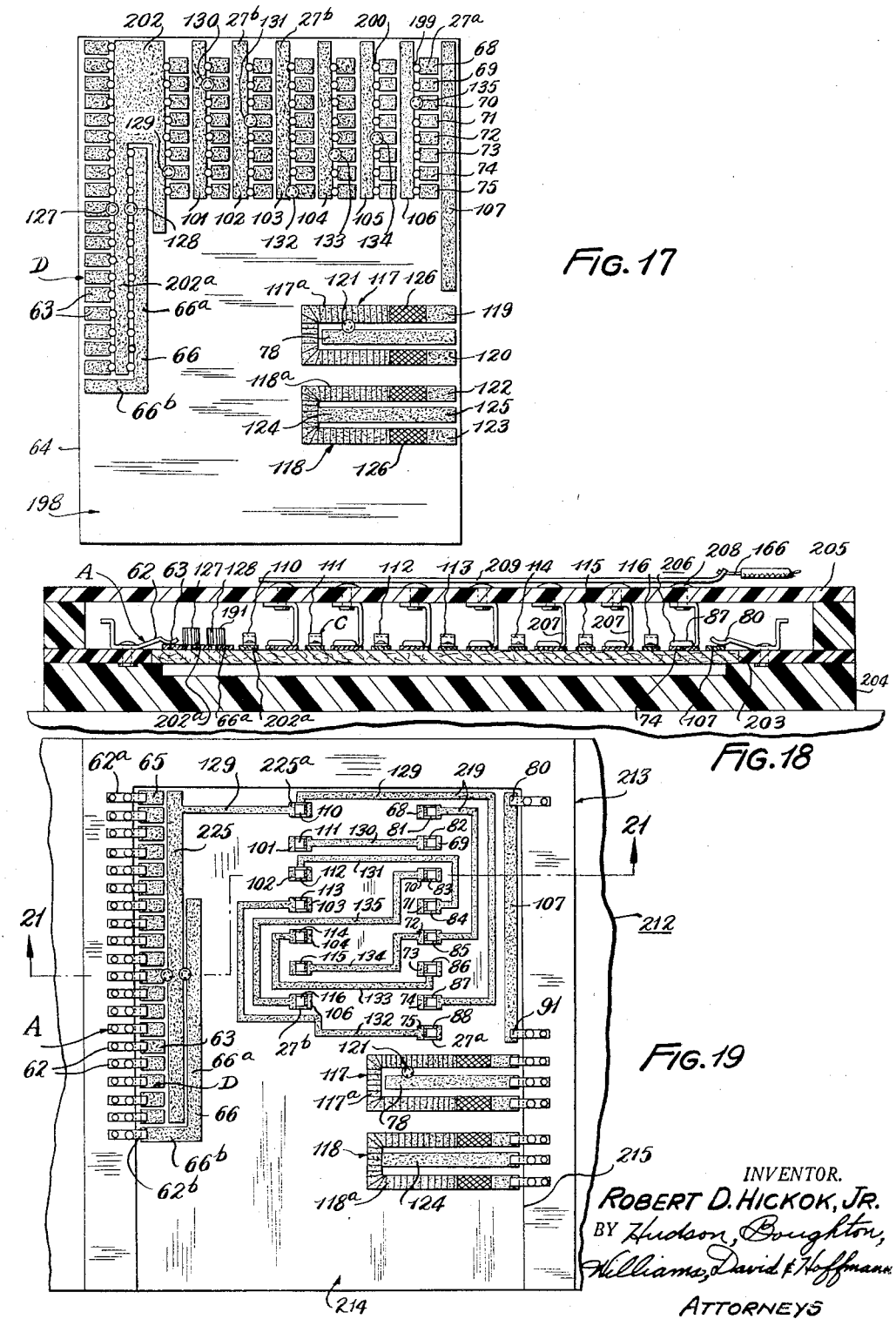

Jan. 20, 1959  R. D. HICKOK, JR  2,870,400
TUBE TESTER
Filed Feb. 11, 1955  6 Sheets-Sheet 6

INVENTOR.
ROBERT D. HICKOK, JR.
BY Hudson, Boughton,
Williams, David & Hoffmann
ATTORNEYS

United States Patent Office 2,870,400
Patented Jan. 20, 1959

2,870,400

TUBE TESTER

Robert D. Hickok, Jr., Daisy Hill, Ohio, assignor to Cleveland Patents, Incorporated, Cleveland, Ohio, a corporation of Ohio Application February 11, 1955, Serial No. 487,516

21 Claims. (Cl. 324—22)

This invention relates to tube testers for testing electron tubes, and more particularly to a tube testing apparatus of the card controlled type with which the testing of various functions and characteristics of tubes of different types can be carried out quickly and easily by simply selecting and inserting a control card corresponding with a particular type of tube to be tested.

An object of the present invention is to provide a tube tester which is relatively simple in its construction and operation and which employs a circuit selecting and completing control member having conducting elements thereon, preferably a card or the like carrying such elements, and with which tester the testing of a tube of a particular type involves only the selection and insertion of such a control card having conducting elements thereon in a pattern which corresponds with that particular type of tube.

Another object is to provide such a card controlled tube tester having a guideway and switch contacts adjacent the guideway, and in which a control card movable in the guideway has conducting elements thereon, such as conducting elements of the adherent or so-called "printed circuit" type, for cooperation with the switch contacts in selecting and completing the tube testing circuits.

A further object is to provide such a card controlled tube tester in which power circuit means for connection with a power source is controlled by switch means responsive to movement of a control card carrying conducting elements, and in which the closing of the power circuit means is preferably produced by a final portion of the movement of the control card, after the desired test circuit connections have been selected by the conducting elements of the card in response to an initial card movement.

Still another object is to provide a card controlled tube tester of the kind just above referred to in which the switch means of the power circuit means comprises switch contacts adjacent the guideway and engageable by certain of the conducting elements of the control card.

Yet another object is to provide a card controlled tube tester of the character above indicated in which the switch means of the power circuit means is a switch device, such as a so-called "microswitch," adapted to be mechanically actuated by movement of a control card carrying the conducting elements which select the test circuits.

As another of its objects, this invention provides a card controlled tube tester of the kind indicated above in which the conducting elements of the control card comprise contact groups disposed with contact elements of one group located in adjacent relation to contact elements of another group, and in which the contact groups can be located either on one side of the card or on opposite sides thereof.

This invention further provides such a card controlled tube tester in which the control card is a so-called "universal" card whose conducting elements are initially in a pattern common to all of the different types of tubes for which the tester is designed, and in which the universal pattern of the conducting elements of an individual card is readily convertible to a pattern corresponding with a particular type of tube.

Another object is to provide a card controlled tube tester having relatively stationary switch contacts adjacent a guideway and in which the conducting elements of the control card are disposed in one or more groups or rows with portions of at least some of the elements located adjacent one or more edges of the card as terminals or movable switch contacts for engagement with the stationary switch contacts.

It is also an object of this invention to provide such a card controlled tube tester in which certain of the conducting elements are on one face of the control card and engageable with certain of the stationary switch contacts, and others of the conducting elements are on the other face of the card and engageable with others of the stationary switch contacts and in which conducting means extending through the card connects one or more elements on one face with one or more elements on the other face.

As still another object, the invention provides such a card controlled tube tester in which the conducting elements on one face of the control card are spaced conducting strips extending in crossing relation to spaced conducting strips on the opposite face of the card.

Within the purview of the foregoing objects, this invention contemplates that the stationary switch contacts can be provided in any desired number with such contacts disposed in one or more rows extending along one or more edges of the guideway, or with some or all of such stationary switch contacts lying within the plan area of the guideway and spaced inwardly from the edges thereof. It is also within the purview of the foregoing objects that the stationary switch contacts can be located in one common plane for engagement by contact elements on one side of the control card or in two common planes for engagement by contact elements on both sides of the card.

It is likewise within the purview of the foregoing objects that the movable contact elements on the control card can be provided in any desired number and can all be located along one or more edges of the card, or can all be located on the card inwardly of the edges thereof, or can be located on the card with some disposed along one or more edges and others spaced inwardly of the card edges, such number and location of the movable contact elements being dependent upon the number and location of the stationary switch contacts.

A further object is to provide a card controlled tube tester in which the stationary switch contacts include voltage supply contacts adjacent the guideway, such as a row of stationary switch contacts connected with taps of a voltage transformer, with which a row of the conducting elements of the control card are engageable for supplying voltages of various values and for various purposes such as filament voltages, plate voltages, grid voltages and the like.

It is likewise an object of this invention to provide a card controlled tube tester in which the control card carries a resistance device or devices, such as a bias resistor or a center-tapped resistor, preferably in the form of an adherently connected resistance strip whose resistance value can be varied to suit various test requirements.

As a further object this invention provides a card controlled tube tester in which a resistor carried by the control card comprises a resistance strip, preferably of loop form, and a lead strip connected with the resistance strip at a desired point of the latter.

Yet another object is to provide such a card controlled tube tester in which a resistor strip carried by the control card includes a length-adjusting section of a different resistance coefficient, and in which end portions of the resistance strip and a lead strip are located adjacent the edge of the card and form movable switch contacts.

Additionally, this invention provides a circuit control device comprising a card, or card-like insulating sheet, having some or all of the above-mentioned conducting elements thereon.

Other objects and advantages of the invention will be apparent in the following detailed description and in the accompanying sheets of drawings forming a part of this specification and in which:

Figs. 11, 12 and 13 are views corresponding respectively with Figs. 5, 6 and 7 and showing a similar control card but representing a modified construction;

Fig. 14 is a larger scale side view of a removable connection member for use in openings of the control card;

Fig. 15 is an end view of such connection member;

Fig. 16 is a schematic partial plan view of a modified card controlled tube tester in which the control card of the selector switch mechanism is a universal card having conducting elements on one side only, portions of the upper contact support member of the selector switch mechanism being broken away;

Fig. 17 is a plan view of the control card of Fig. 16 but shown removed from the guideway;

Fig. 18 is a larger scale partial transverse vertical section taken through the modified tube tester of Fig. 16 as indicated by the section line 18—18 thereof;

Fig. 19 is a schematic view of a tube tester similar to that of Fig. 16 but showing another modified construction using a non-universal control card having conducting elements on one side only, the view being a partial sectional plan view taken as indicated by section line 19—19 of Fig. 21;

Figure 1:
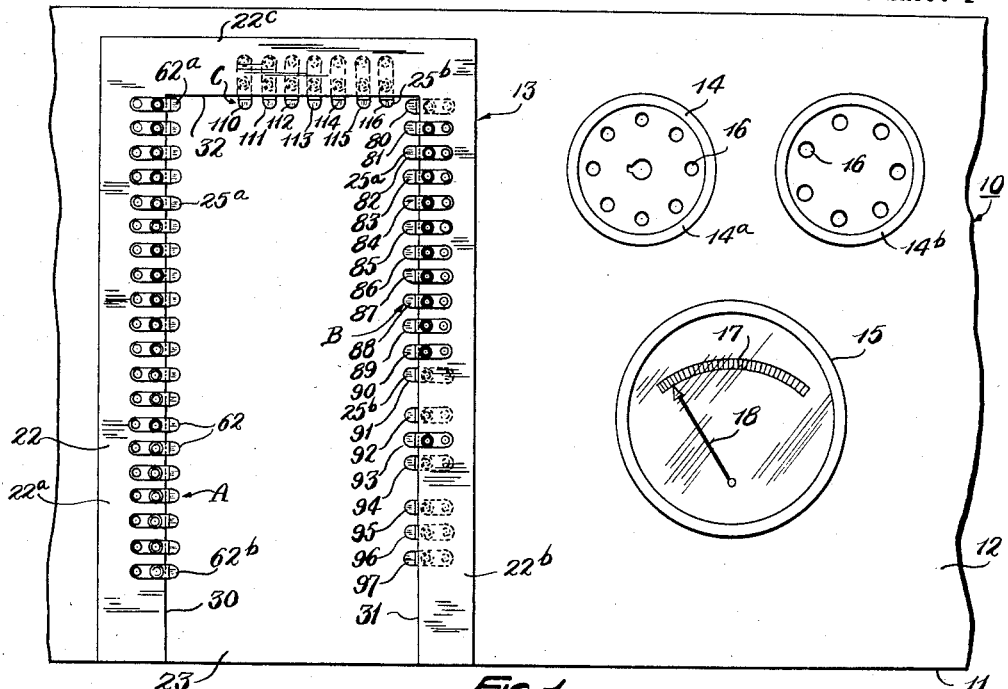
Fig. 1 is a partial plan view of a tube tester embodying this invention and shown with the cover removed from the circuit selecting switch mechanism and with the control card removed from the guideway of such circuits selecting switch mechanism.

The card controlled tube tester 10 comprises, in general, a suitable housing 11 having a substantially flat top or cover 12 on which various components are mounted including a circuit selecting switch mechanism 13, a plurality of tube sockets 14 and an indicating meter 15. The tube tester 10 can be provided with any desired number of the test sockets 14 depending upon the number of different types of tubes for which the tester is designed. In this instance, only two tube sockets 14$^a$ and 14$^b$ are shown and these have different numbers of terminal pin holes 16 for receiving the terminal pins of different types of tubes.

The indicating meter 15 is a meter of the galvanometer type, of any available construction suitable for tube testing purposes, and embodies an indicating scale 17 and a pointer 18 movable relative to such scale for indicating the quality or other characteristics of a tube being tested. The meter 15 here shown is one known as a direct current dynamic mutual conductance meter.

The circuit selecting switch mechanism 13 comprises a pair of upper and lower guide members 20 and 21 mounted on the housing 11 with an intervening spacer member or frame 22 therebetween so as to define an elongated guideway 23 into which a control card 24 is insertable. The spacer member 22 is made of a suitable insulating material and the guide members 20 and 21 are preferably also made of an insulating material. The upper guide member 20 also forms a top or cover for the switch mechanism 13.

The switch mechanism 13 also comprises stationary switch contacts 25 located adjacent the guideway 23 for cooperation with the control card 24 when the latter is inserted into the guideway. The particular location and purpose of the various stationary switch contacts 25 will be described hereinafter.

The control card 24 comprises a card-like sheet 26 of rigid or semi-rigid insulating material, such as paper or resin-impregnated paper, and conducting elements 27 carried by the card. The conducting elements 27 comprise at least two groups and are disposed on the card with conducting elements of one group in adjacent relation to conducting elements of another group. In the form of the control card used in the tube tester 10, the conducting elements 27 are located on both faces of the card, the conducting elements on the upper face being designated 27$^a$ and those on the lower face being designated 27$^b$. The conducting elements 27 constitute movable switch contacts which are engageable with the stationary switch contacts 25 for selecting and completing the desired test circuits when the card 24 is inserted into the guideway 23. The number, shape and relative arrangement of the conducting elements 27 can be varied in accordance with the requirements of the various different tests to be performed and will be described hereinafter.

The conducting elements 27 are of the kind known in the art as "printed circuit" elements and may be in the form of metallic strips or contact members adherently connected with the card, such as conducting elements remaining on the card surface after etching, electrolysis or other suitable chemical process, or conducting elements produced by spray-depositing particulate metal on the desired areas of the card surface, or by depositing conducting material through a silk screen.

One of the features of this invention is that the control card 24 can be a so-called "universal" control card whose conducting elements 27 are provided thereon in a pattern or arrangement such as to initially constitute a general or basic connectible pattern which is common to all of the different types of electron tubes for which the tube tester 10 is designed. The tube tester 10 will include a set of the control cards 24 of which the individual cards will have their conducting elements 27 converted to specific patterns corresponding with the individual tubes of different types for which the tester 10 is designed.

In other words, of the set of control cards furnished with the tube tester 10, each control card will represent a particular type of electron tube and when a tube of that particular type has been inserted in an appropriate one of the sockets 14, it will only be necessary to select the control card corresponding with that particular type of tube and insert the selected card into the guideway 23. The mere insertion of the proper control card in the guideway will select and complete the test circuits for carrying out a more or less complete test of that particular type of electron tube.

The universal pattern of the conducting elements 27 of a universal or stock control card is converted to a specific pattern corresponding with a particular type of tube by connecting certain of the conducting elements of one group with certain of the conducting elements of another group by connecting means which is also carried by the card. In the case of the control card 24, certain of the conducting elements on one face of the card are connected with certain of the conducting elements on the other face of the card by means of conducting connections 28, such as rivets, solder, or the like, extending through the card. The control card 24 is here shown as being a control card whose specific pattern of conducting elements 27 makes it appropriate for use in the tube tester 10 for testing a 6SK7 electron tube, and the circuits selected and completed by this 6SK7 control card will be described hereinafter with reference to the wiring diagram of Fig. 8.

The guideway 23 has substantially parallel side edges 30 and 31 defined by the laterally spaced parallel portions 22$^a$ and 22$^b$ of the spacer member 22. The guideway also has an inner or transverse edge 32 at the closed inner end thereof and which is defined by the transverse portion 22$^c$ of the spacer member 22. The stationary switch contacts 25 are formed by portions of clip-like terminal members 33 which are suitably fixed on the spacer member 22. These switch contacts 25 are formed by the finger portions of these clip-like members which project in overhanging relation into the guideway 23.

In the tube tester 10 the switch contacts 25 are arranged in rows or banks extending along edge portions of the guideway 23 with certain of these contacts, in this instance the contacts 25$^a$, located in an upper common horizontal plane and with others of the switch contacts, in this instance the contacts 25$^b$, located in a lower substantially parallel common horizontal plane. When the control card 24 is inserted into the guideway 23, the stationary switch contacts 25$^a$ are engaged by the conducting elements 27$^a$ which are located on the upper face of the control card and the stationary switch contacts 25$^b$ are engaged by the conducting elements 27$^b$ on the lower face of the control card.

In the switch mechanism 13 here illustrated, the switch contacts 25$^a$ constituting the row A extending along the edge 30 of the guideway 23 all lie in the upper common plane and are engageable by conducting elements 27$^a$ on the upper face of the control card 24. The switch contacts 25$^b$ of the row C extending along the transverse edge 32 of the guideway are all located in the lower common plane and are engageable by conducting elements 27$^b$ on the lower face of the control card. The switch contacts extending along the edge 31 of the guideway 23 constitute a contact row B which includes contacts located in the upper plane as well as contacts located in the lower plane, as is further explained hereinafter.

Figure 8:
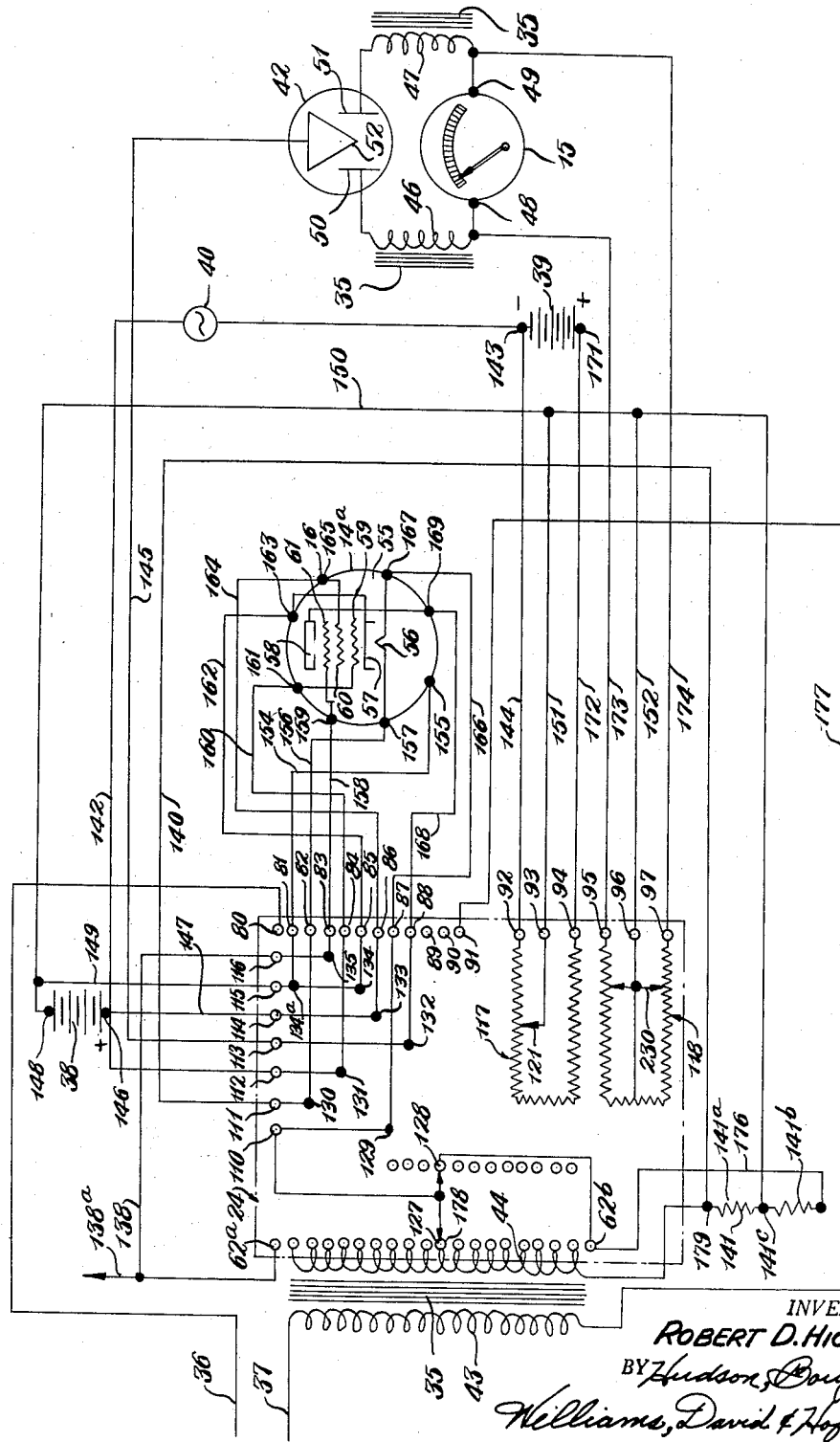
Fig. 8 is a schematic wiring diagram showing circuits of the tube tester as selected and completed by the control card for a given type of tube.

As indicated in the wiring diagram of Fig. 8, the tube tester 10 also includes a transformer 35 and a pair of power lead conductors 36 and 37 for connecting the transformer with a suitable source of current, such as a supply of 110 volt 60 cycle alternating current. The tube tester 10 also includes batteries 38 and 39 or other suitable source of direct current voltage, and a suitable signal source or generator 40 for producing a signal for tube testing purposes. Additionally, the tube tester 10 comprises a rectifier 42, such as a suitable rectifier tube which is here represented as being associated with the direct current indicating meter 15.

The transformer 35 comprises a primary winding 43, which is energized from the power source through power circuit means controlled by the switch mechanism 13 as explained hereinafter, and a tapped secondary winding 44 as a source of different voltages to be applied to the desired element or elements of the tube being tested, such as to the filament, plate or grids thereof. The taps of the secondary winding 44 are here shown as filament taps and are connected with the switch contacts 25$^a$ of the contact row A.

The transformer 35 also comprises secondary windings 46 and 47 which are connected with the terminals 48 and 49 of the indicating meter 15 and with the plates 50 and 51 of a rectifier tube 42. The rectifier tube 42 also includes a cathode 52 and can be a No. 83 mercury type rectifier tube.

In the wiring diagram of Fig. 8, a 6SK7 electron tube 55 is shown in the socket 14$^a$ and comprises cooperating elements conventional to this type of tube and consisting of a filament or heater 56, a cathode 57, a plate 58, a signal grid 59, a screen grid 60 and a suppressor grid 61.

The terminal members of all of the tube sockets 14 are connected with the switch contacts 25 of the switch mechanism 13 by suitable conductors, but for the sake of simplicity, these circuit connections are shown and described herein only for the 6SK7 tube 55. These circuit connections for this particular tube are shown in Fig. 8 and will be described presently.

Figures 5, 6, 7:
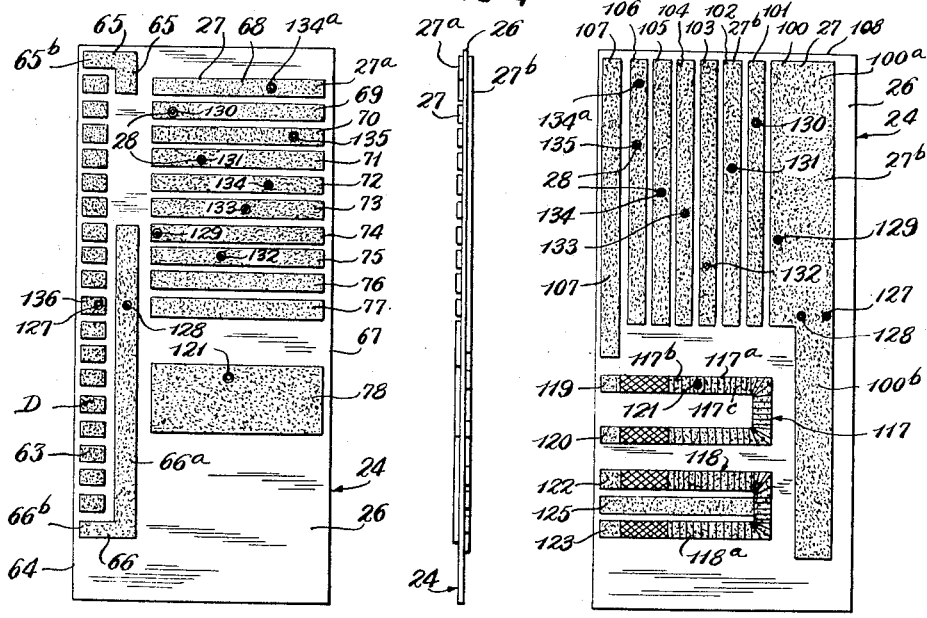
Fig. 5 is an edge view of the control card carrying the circuit-selecting conducting elements.
Figs. 6 and 7 are true top and bottom plan views, respectively, of the control card removed from the guideway of the switch mechanism.

The universal pattern of the conducting elements 27 of the control card 24 will now be described in greater detail. As shown in Fig. 6, the conducting elements 27$^a$ on the upper surface of the control card 24 include a row of relatively small substantially square conducting elements or contacts 63 located adjacent the side edge 64 of the card and constituting a contact row D. The conducting elements on the upper face of the card 24 also include L-shaped conducting strips 65 and 66 located at the ends of the contact row D and which have leg portions 65$^a$ and 66$^a$ extending towards each other just inwardly of, and alongside of the contact row D. The outer ends or terminals of the L-shaped strips 65 and 66 lie adjacent the card edge 64 and constitute the end contacts 65$^b$ and 66$^b$ of the contact row D.

When the control card 24 is inserted into the guideway 23 of the tube tester 10, the end contacts 65$^b$ and 66$^b$ of the contact row D engage the stationary switch contacts 62$^a$ and 62$^b$ at the ends of the contact row A, and the intermediate elements 63 of the contact row D of the control card engage, respectively, the remaining stationary switch contacts 62 of the contact row A.

The conducting elements 27$^a$ on the upper face of the control card 24 also include a group of spaced-apart parallel transverse conducting strips extending crosswise of the card with end portions or terminals of such strips located adjacent the side edge 67. For the purpose of individual identification of these strips, they are designated by the reference characters 68, 69, 70, 71, 72, 73, 74, 75, 76, 77 and 78.

When the control card 24 is inserted in the guideway 23, the terminal portions of the conducting strips 68 to 78 inclusive engage certain of the stationary switch contacts of the contact row B. For purposes of individual identification of the switch contacts of contact row B, they are designated by the reference characters 80, 81, 82, 83, 84, 85, 86, 87, 88, 89, 90, 91, 92, 93, 94, 95, 96 and 97. The contacts of row B, which are thus engaged by the transverse strips 68 to 78 inclusive of the control card, are the contacts 81 to 90 inclusive and 93.

The conducting elements 27ᵇ on the lower face of the control card 24 comprise a group of spaced-apart substantially parallel longitudinal conducting strips extending lengthwise of the card and in crossing relation to the transverse conducting strips 68 to 78 inclusive of the upper card face. For the purpose of individual identification, these longitudinal conducting strips on the lower face of the card are designated by the reference characters 100, 101, 102, 103, 104, 105, 106 and 107.

The longitudinal conducting strip 100 is a relatively wide strip which is located on the lower face of the card so as to lie substantially opposite the contact row D and the leg portions 65ᵃ and 66ᵃ of the L-shaped strips 65 and 66. The width of the relatively wide end portions 100ᵃ of the conducting strip 100 is such that this wide end portion will span or overlie certain of the contacts of the contact row D and the adjacent end portions of the transverse conducting strips 68 to 77 inclusive. The relatively narrow end portion 100ᵇ of the conducting strip 100 is of a width to span or overlie certain of the contacts 63 of contact row D and the leg portion 66ᵃ of the L-shaped strip 66.

The outer ends of the conducting strips 100 to 106 inclusive form terminal portions or contacts lying adjacent the transverse edge 108 of the control card 24 and, when the card is inserted into the guideway 23, these terminal portions engage the stationary switch contacts 25ᵇ of contact row C. For the purpose of individual identification of the switch contacts of contact row C, these contacts are designated by the reference characters 110, 111, 112, 113, 114, 115 and 116. The longitudinal strip 107 is a power circuit control strip whose end portions engage the contacts 80 and 91 of the contact row B.

The control card 24 is here shown as carrying one or more resistance devices 117 and 118 for use in tube testing operations and of which the resistance device 117 is intended for use as a bias resistor and the device 118 is a center-tapped meter resistor. These resistance devices can be of any suitable construction but preferably comprise adherent electrically conductive resistance strips 117ᵃ and 118ᵃ made of electrically conductive material having a suitable resistance coefficient, such that desired resistance values will be obtainable in accordance with the portion of the strip length through which the current flows.

In the resistance device 117, the strip 117ᵃ is in the form of a loop or U-shaped strip having its end portions located adjacent the side edge 67 of the control card so as to constitute terminal portions or contacts 119 and 120 which are engageable with the stationary switch contacts 92 and 94, respectively, when the control card is inserted into the guideway 23. The resistance strip 117ᵃ, as provided on the control card 24, is located on the lower face of the card such as to lie opposite the relatively wide conducting strip 78 of the upper card face.

With this relative arrangement for the strips 78 and 117ᵃ, the conducting strip 78 will constitute a lead conductor for the resistance device when this strip is connected with the resistance strip 117ᵃ through the card as by means of a through connection 121. The point at which the through connection 121 is located along the length of the resistance strip 117ᵃ will determine the resistance values of the two leg portions 117ᵇ and 117ᶜ of this resistance strip which are located on opposite sides of such through connection.

The resistance device 118 also comprises a resistance strip 118ᵃ in the form of a loop or substantially U-shaped conducting strip adherently connected to the lower face of the control card 24 and whose ends form terminals or contacts 122 and 123 adjacent the side edge 67 of the card. A conducting strip 124 located between the arms of the U-shaped resistance strip 118ᵃ forms a lead conductor whose inner end is connected to the resistance strip at substantially the midpoint thereof, and whose outer end is located adjacent the side edge 67 of the card to constitute a terminal or contact 125.

The location of the lead strip 124 is, therefore, such as to form a center tap for the resistance strip 118ᵃ, and the strips 118ᵃ and 124 together constitute a center-tapped resistor carried by the control card. When the control card is inserted in the guideway 23, the terminals 122 and 123 engage the stationary switch contacts 95 and 97, respectively, of contact row B and the terminal 125 engages the stationary switch contact 96.

A novel feature of the resistance devices 117 and 118 resides in the use of a length adjusting section 126 as a part of, or in series with, the resistance strips 117ᵃ and 118ᵃ. The section 126 is an adherent conductive strip portion of a different composition or conductivity than the remaining portion of the strip so as to have a different resistance coefficient. The section 126 will usually have a lower resistance coefficient than the strips 117ᵃ and 118ᵃ and serves to shorten the over-all length of the resistance strips to one in which the strips 117ᵃ and 118ᵃ will provide the desired range of resistance values. In some instances the section 126 may have a higher resistance coefficient than the strips 117ᵃ and 118ᵃ.

Figure 20:
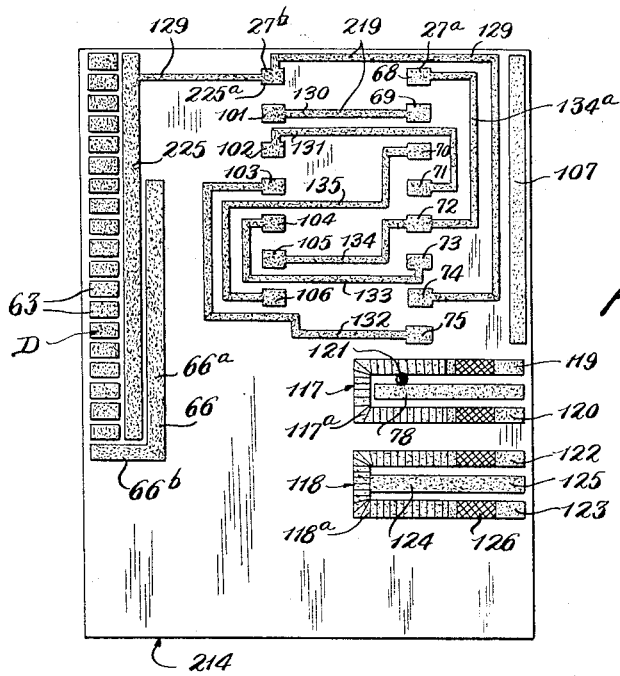
Fig. 20 is a plan view of the control card of Fig. 19 but shown removed from the guideway.

Although the resistance devices 117 and 118 are mounted on the control card 24 by the resistance strips 117ᵃ and 118ᵃ being on the lower face of the card, these resistance devices could be mounted on the upper card face, as the drawings show for similar or identical resistance devices in Figs. 17 and 20.

The universal pattern of the conducting elements of the control card 24 is altered or converted to a specific pattern suitable for a particular type of electron tube by establishing the electrical connections 28 between adjacent conducting elements of different groups. In the case of the control card 24, the connections 28 extend through the card at the proper points between various ones of the conductive elements 27ᵃ and 27ᵇ on the opposite card faces. In the variable resistance device 117 formed by the conducting strips 117ᵃ and 78, the location of the through connection 121 is such that the resistance values of the arm portions 117ᵇ and 117ᶜ of the strip 117ᵃ will be suitable for the requirements of the testing circuits for the 6SK7 tube 55. The various other electrical connections made through the control card 24 to convert the universal pattern of the conducting elements to a specific pattern corresponding with the 6SK7 tube 55, include through connections which are identified individually by the reference characters 127, 128, 129, 130, 131, 132, 133, 134 and 135.

The through connections 127 and 128 connect the transformer voltage contact 136 of contact row D and the L-shaped strip 66 with the conducting strip 100 on the lower card face. The through connection 129 connects the transverse upper strip 74 with the longitudinal lower strip 100. The through connections 130, 131 and 132 connect the transverse upper strips 69, 71 and 75, respectively, with the longitudinal lower strips 101, 102 and 103. Similarly, the through connections 133, 134 and 135 connect the transverse upper strips 73, 72 and 70, respectively, with the longitudinal lower strips 104, 105 and 106.

As shown in the wiring diagram of Fig. 8, the circuit connections for use in testing the 6SK7 tube 55 include a conductor 138 connecting the stationary end switch contact 62ᵃ of the contact row A with the stationary switch contact 116 of the contact row C. A conductor 140 connects the stationary switch contact 111 of contact row C with one end of a resistor 141 which comprises resistor sections 141ᵃ and 141ᵇ. A conductor 142 connects the stationary switch contact 112 of row C with the signal source 40 and with the terminal 143 of the battery 39. This terminal of the battery 39 is also connected with the stationary switch contact 92 of row B by a conductor 144. The stationary switch contact 113 of row C is connected through a conductor 145 with the cathode 52 of the rectifier tube 42. The stationary contact 114 is connected with the terminal 146 of the battery 38 by a conductor 147. The stationary switch contact 115 is connected with the terminal 148 of the battery 38 through a conductor 149 and this terminal of the battery 38 is also connected with the resistor 141 and an intermediate point 141c of the latter through the conductor 150.

In the contact row B of the stationary switch contacts, the contacts 93 and 96 are both connected with the conductor 150 by the branch conductors 151 and 152. The stationary contact 81 is connected through a conductor 154 with the terminal 155 of the tube socket 14a. The stationary switch contact 82 is connected with one terminal of the filament 56 through a conductor 156 and the socket terminal 157. The stationary switch contact 83 is connected with the suppressor grid 61 through a conductor 158 and the socket terminal 159. The stationary switch contact 84 is connected with the signal grid 59 through a conductor 160 and the socket terminal 161.

Likewise in contact row B, the stationary switch contact 85 is connected with the cathode 57 through a conductor 162 and the socket terminal 163. The stationary switch contact 86 is connected with the screen grid 60 through a conductor 164 and the socket terminal 165. The stationary switch contact 87 is connected with the other side of the filament 56 through a conductor 166 and the socket terminal 167. The stationary switch contact 88 is connected with the plate 58 through a conductor 168 and the socket terminal 169.

Figures 2, 3:
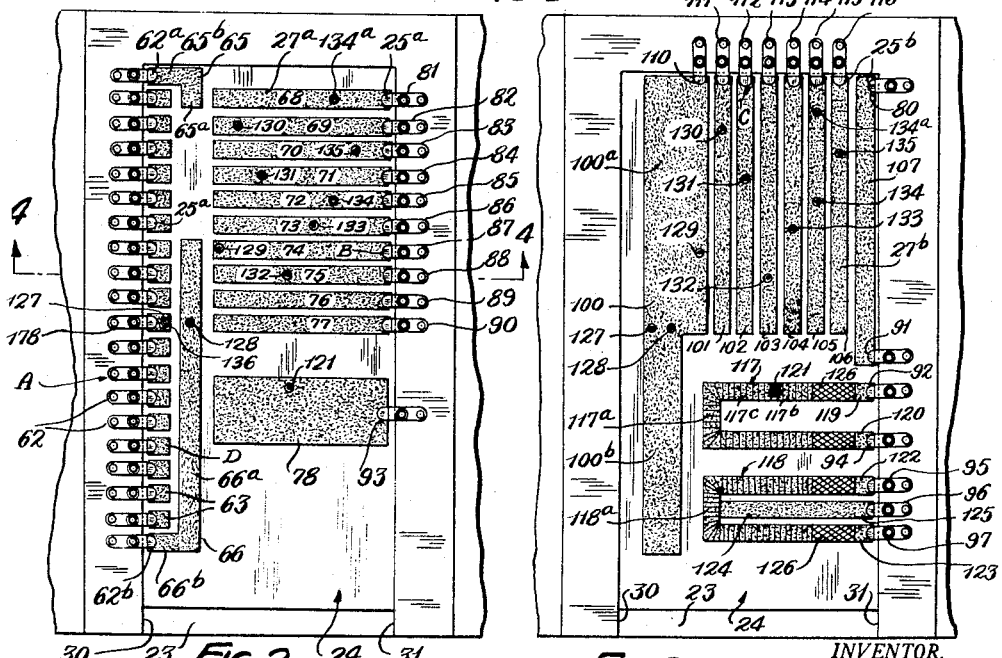
Fig. 2 is a schematic partial plan view with the control card fully inserted into the guideway and illustrating the circuit-selecting function of the conducting elements on the upper face of the card.
Fig. 3 is a schematic partial plan view similar to Fig. 2, but illustrating the circuit-selecting function of the conducting elements on the lower face of the card, such conducting elements being shown as if seen through the card.

In a 6SK7 tube the terminal pin which engages the socket terminal 155 is a blind pin, that is, is not connected with any of the elements of the tube. It is desirable in the testing of a 6SK7 tube that the socket terminal 155 be connected with the cathode 57 and provision is here made in the control card 24 for accomplishing this. As shown in Figs. 2, 3 and 8 the socket terminal 155 can be connected with the cathode 57 by providing the card 24 with an additional through connection 134a which connects the upper strip 68 with the lower strip 105.

As shown in the wiring diagram of Fig. 8, the terminal 171 of the battery 39 is connected with the stationary switch contact 94 of the contact row B by a conductor 172. The terminals 48 and 49 of the indicator 15 are connected, respectively, with the stationary switch contacts 95 and 97 by the conductors 173 and 174. The stationary switch contact 62b at the lower end of the contact row A is connected with the remote end of the resistance device 141 by a conductor 176. The stationary switch contacts 80 and 91 at the extreme ends of the contact row B are power circuit switch contacts of which the contact 80 is connected with the power lead 36, and the contact 91 is connected with the inner end of the primary winding 41 of the filament transformer 35 through the conductor 177.

From the above-described circuit connections and conductive elements of the control card 24, it will be seen that when the control card has been inserted into the guideway 23, the conducting strip 107 acts as a movable switch contact whose end portions engage the stationary power circuit contacts 80 and 91 of the contact row B to thereby close the power circuit for connecting the primary winding 43 of the transformer 35 with the current source through the power leads 36 and 37. Since the control card 24 has a specific pattern of conductive elements thereon corresponding with the requirements for the 6SK7 tube 55, the insertion of the control card into the guideway 23 will cause a filament voltage corresponding with the voltage of the transformer tap contact 178 of the contact row A to be supplied to the filament 56 by a circuit which includes the stationary switch contacts 82 and 111. The filament circuit thus established also includes a portion of the transverse conducting strip 69 on the upper face of the card and a portion of the longitudinal conducting strip 101 on the lower face of the card.

As has been indicated above, the stationary switch contacts 25a and 25b are located in upper and lower substantially parallel common planes such that the contacts 25a cooperate with the conducting elements 27a located on the upper face of the control card 24, and the switch contacts 25b cooperate with the conducting elements 27b on the lower face of the control card. All of the stationary switch contacts of the contact row A are located in the upper common plane and all of the stationary switch contacts of the contact row C are located in the lower common plane. The contacts of the contact row B include contacts located in both the upper common plane and the lower common plane. Those contacts of contact row B, which are located in the upper common plane, consist of the contacts 81 to 90 inclusive and 93. The contacts of contact row B, which are located in the lower common plane, are the contacts 80, 91, 92, 94, 95, 96 and 97.

From the detailed disclosure of the tube tester 10, as given in the foregoing description and in the accompanying drawings, the circuits for the various elements of the 6SK7 electron tube 55, as completed by the insertion of the control card 24 for that tube in the guideway 23, can be readily traced. Thus the filament circuit for the filament 56 extends from the tap of the transformer secondary 44 represented by the switch contact 178 into the card contact 136 and the through connection 127 to the wide longitudinal conducting strip 100, then into the through connection 129 and the transverse conducting strip 74 to stationary switch contact 87, and then through the conductor 166 to the filament terminal 167 of the tube socket 14a. The return portion of this filament circuit extends from the filament terminal 157 of the tube socket through the conductor 156 to the stationary switch contact 82, then through transverse conducting strip 69 and through connection 130 into the longitudinal conducting strip 101, and then into stationary switch contact 111 and through conductor 140 back to the terminal 179 which is common to the transformer secondary 44 and the resistor 141.

The external portion of the cathode circuit for the cathode 57 can be traced from the terminal 148 of the battery 38 through the conductor 149 to the stationary switch contact 115, and then through the longitudinal conducting strip 105 and through connection 134 into the transverse conducting strip 72, and then through stationary switch contact 85 and the conductor 162 to the cathode terminal 163 of the tube socket 14a.

The external portion of the circuit for the signal grid 59 can be traced from the terminal 143 of the battery 39 and the signal source 40 through the conductor 142 to the stationary switch contact 112, then through the longitudinal conducting strip 102 and through connection 131 into the transverse conducting strip 71, and then into the stationary switch contact 84 and through the conductor 160 to the signal grid terminal 161 of the tube socket.

The external portion of the circuit for the screen grid 60 can be traced from the terminal 146 of the battery 38 through conductor 147 to the stationary switch contact 114, then through the longitudinal conducting strip 104 and through connection 133 into the transverse conducting strip 73, and thence from stationary switch contact 86 through the conductor 164 to the screen grid terminal 165 of the tube socket.

The external portion of the circuit for the suppressor grid 61 can be traced from the short-circuit test terminal represented by the stationary switch contact 62a through the conductor 138 to the stationary switch contact 116, then through the longitudinal conducting strip 106 and the through connection 135 into transverse conducting strip 70, and thence through stationary switch contact 83 and the conductor 158 to the suppressor grid terminal 159 of the tube socket 14a. The conductor extension 138a connects the stationary switch contact 62a and the suppressor grid 61 with a short-circuit indicator (not shown) such as a neon glow lamp.

The external portion of the plate circuit for the plate 58 can be traced through the conductor 145 to the stationary switch contact 113, then through the longitudinal conducting strip 103 and the through connection 132 into the transverse conducting strip 75 to the stationary switch contact 88, and then through the conductor 168 to the plate terminal 169 of the tube socket 14ª.

The resistance device 141 is used in the test circuits for certain types of electron tubes in which only a relatively low voltage is applied to the filament circuit, and in which the filament itself is the cathode. The main purpose of the resistance device 141 is to return the circuits of the plate, control grid, and other grids to a neutral point 141ᶜ.

The various circuits, which have been traced above as selected and completed for the 6SK7 tube 55 by the control card 24, are by way of example only, inasmuch as other such circuits for similar purposes but which are specifically different from the traced circuits, will be selected and established by the particular control cards for other types of tubes and will make use of various different switch contacts, conductors, through card connections and conducting elements. Thus, on the control card 24 the horizontal conductor strips 76 and 77 are not needed for the circuits of a 6SK7 tube and can be regarded as additional strips or spares which might be needed for the circuits of other types of tubes. One or more such additional strips or spares can be included in the group of longitudinal strips of group 27ᵇ.

Figure 9:
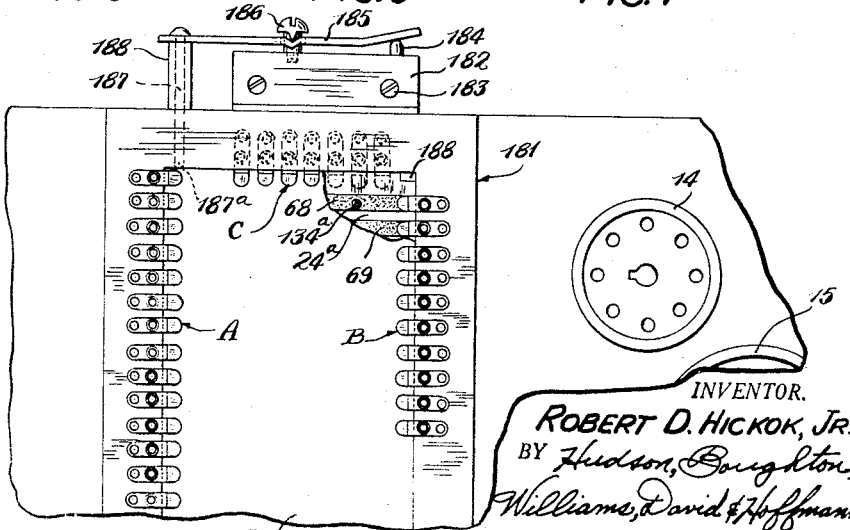
Fig. 9 is a partial plan view similar to Fig. 1 but showing a modified form of tube tester using a different power circuit control switch.

Fig. 9 of the drawings shows a modified selector switch 181 which is similar to the above-described selector switch 13 and can be used in a similar manner in the tube tester 10. In the selector switch 181, however, the power circuit stationary switch contacts 80 and 91 have been omitted, as well as the longitudinal power circuit conducting strip 107. In this modified selector switch 181, the power circuit is controlled by a control switch 182 of the so-called "microswitch" type which is located adjacent the inner end of the guideway 23. The control switch 182 is mounted adjacent such inner end of the guideway by being secured to a projecting portion of the cover 12 as by means of the screws 183.

The control switch 182 has a projecting actuating stem 184 which is engageable by a lever 185 loosely fulcrumed on a fulcrum screw 186 and which lever has a thrust pin 187 attached thereto. The thrust pin 187 extends through a sleeve 188 such that its free end 187ª projects into the guideway 23 to be engaged directly by the inner end of a control card 24ª when the latter is fully inserted into the guideway. With the arrangement of the control switch 182 just described, it will be seen that upon insertion of the control card 24ª into the guideway 23, the conducting elements of the card will cooperate with the various stationary switch contacts in selecting and completing the desired testing circuits for the electron tube being tested, and that the final inward movement of the control card will cause the same to engage and move the pin 187 to thereby close the control switch 182 and complete the power circuit.

The control card 24ª of Fig. 9 is identical with the control card 24 with the exception that it has a corner notch 188 in one inner end corner thereof. The purpose of the notch 188 is to insure the proper positioning of the card 24ª in the guideway 23. Thus, if the card 24ª is inserted in the guideway incorrectly, the notch 188 will be presented to the pin 187 and will prevent the card from actuating the switch 182.

Figs. 11, 12 and 13 show a control card 190 which is generally similar to the control cards 24 and 24ª in that it has groups of conducting elements 27ª and 27ᵇ on the upper and lower faces thereof and is a universal card usable in the selector switch mechanisms 13 and 181 of the above-described tube tester 10. The control card 190, however, represents a modified form of card which is adapted for the connection of contact elements of one group with contact elements of the other group by the use of removable connector members 191 inserted into openings 192 provided in the card. The connector members 191 serve the same purpose as the above-mentioned connector members 28 and, although the removable members 191 are preferable, the connections could be made by using rivets or solder in the holes 192.

The conducting elements constituting the group 27ª on the upper face of the control card 190, as shown in Fig. 12, are substantially the same conducting elements as are provided on the upper surface of the control card 24 of Fig. 6 and are individually designated by the same reference characters. The conducting elements constituting the group 27ᵇ on the lower surface of the control card 190, as shown in Fig. 13, are substantially the same as those provided on the lower surface of the control card 24 and are individually designated by the same reference characters.

The openings 192 are provided in the control card 190 at the points where connections might be desired between conducting elements of the two groups for the purpose of converting the universal pattern of the card to a specific pattern corresponding with a particular electron tube desired to be tested in the tube tester 10. To illustrate this adaptability of the universal control card 190, Figs. 11, 12 and 13 also show this card with the pattern of conducting elements thereof converted to a control card for use in testing a 6SK7 tube.

The conversion of the universal card 190 to a control card for a 6SK7 tube has been accomplished by inserting connector members 191 in the appropriate openings 192 of the card. The connector members thus applied to the card 190 have also been designated with the same reference characters as have been applied to the corresponding through connectors of the above-described 6SK7 control card 24.

The connector member 191 can be of any appropriate size and shape and, as shown in Figs. 14 and 15, may comprise an electrically conducting stem 193 of a size to have a relatively tight-fitting engagement in one of the openings 192 in electrically conductive engagement with adjacent conducting elements on opposite sides of the card. The connector member 191 also comprises a knurled head 194 by which this member can be conveniently grasped for inserting or removing the stem 193 in one of the card openings 192.

Fig. 16 of the drawings shows a modified form of tube tester 196 which is generally similar to the tube tester 10 but in which the selector switch mechanism 197 is somewhat different in that it is designed to use a control card 198 which has conducting elements on one side only thereof. Such a control card having the conducting elements on one side only is relatively cheaper to produce than a control card having the conducting elements on both sides thereof and, inasmuch as a substantial number of control cards would be needed to represent a desired variety of electron tubes, the over-all cost of a tube tester and its complement of control cards could thereby be substantially reduced.

As shown in Figs. 16 and 17, the control card 198 is a universal control card adaptable for different types of electron tubes and carries conducting elements which include two groups of such elements 27ª and 27ᵇ corresponding with the upper and lower groups of conducting elements 27ª and 27ᵇ of the above-described control card 24. The group 27ª comprises transversely extending substantially parallel horizontal rows of conducting elements which correspond with the horizontally extending conductor strips 68, 69, 70, 71, 72, 73, 74 and 75 of the control card 24 and which have been individually designated by these same reference characters. The group 27ᵇ comprises longitudinally extending substantially parallel conductor strips corresponding with the longitudinally extending conductor strips 101, 102, 103, 104, 105 and 106 of the control card 24 and have been individually designated by these same reference characters.

These two groups of conducting elements 27ᵃ and 27ᵇ are located on the control card 198 so that the horizontal rows of conducting elements 68 to 75 inclusive constitute interrupted rows, that is, rows having spaces or interruptions 199 therein. The interruptions 199 of the contact rows 68 to 75 inclusive are in an aligned relation and define longitudinal passages in the contact group 27ᵃ through which the conductor strips 101 to 106 inclusive extend, such that certain of the conducting elements of one group are in adjacent relation to certain of the conducting elements of the other group.

In the conversion of the universal control card 198 to a control card suitable for a particular type of electron tube, certain of the conducting elements of the group 27ᵃ are electrically connected with certain of the conducting elements of the group 27ᵇ and this is accomplished by the use of suitable connector members, such as the above-described removable connector members 191. When connector members of this form are used, the control card 198 is provided with suitably located openings 200 therein to receive the stems 193 of these connector members.

To further illustrate this conversion of the control card 198, Figs. 16 and 17 show this control card with connector members 191 mounted therein in the appropriate locations to render the card suitable for testing a 6SK7 tube. The individual connectors 191 thus mounted on the control card 198 have been designated in Figs. 16 and 17 by the same reference characters as the through connections of the above-described 6SK7 control card 24.

When the conducting elements are provided on one surface only of the control card, as in the case of the control card 198 just described above, the card may also carry the contact row D of spaced conducting elements 63 extending along the side edge 64 of the card and the L-shaped conductor strip 66. The card 198 may also carry a conductor strip 202 which corresponds with the conductor strip 100 on the lower face of the control card 24 but which is of a somewhat different shape.

The conductor strip 202 is located on the card 198 between the contact row D and the adjacent end of the group of conducting elements 27ᵃ, such that electrical connection can readily be made between this strip and adjacent conducting elements of both the contact row D and the contact group 27ᵃ. The conductor strip 202 is of a shape such that a leg 202ᵃ thereof extends between the contact row D and the leg 66ᵃ of the conductor strip 66, such that desired electrical connections can be readily made between the strip 202 and the leg 66ᵃ, as well as between the strip 202 and the contact row D.

The selector switch mechanism 197 is shown in Figs. 16 and 18 as having a guideway 203 defined between a pair of connected base and support members 204 and 205 so as to receive the control card 198 therein with the conducting elements of the latter facing upwardly. The selector switch mechanism 197 is similar to the above-described selector switch mechanism 13 in that it has stationary switch contacts along the side and end edges 30 and 32 of the guideway corresponding generally with the rows of switch contacts A and C of the selector switch mechanism 13 and which stationary switch contacts have been individually designated by the same reference characters, the stationary switch contacts along the edge 30 being 62ᵃ, 62ᵇ and 63 and those along the edge 32 being 110 to 116 inclusive. The stationary contacts 111 to 116 have conductors connected therewith corresponding with the conductors 140, 142, 145, 147, 149 and 138 of Fig. 8.

The selector switch mechanism 197 differs from the selector switch mechanism 13, however, in that the stationary switch contacts corresponding with those of contact row B of Fig. 1 are mounted on the support member 205 and lie within the plan area of the guideway and inwardly of the side edges thereof. These stationary switch contacts which are mounted on the support member 205 comprise a bank of such contacts 206 composed of horizontally extending contact rows which correspond with the stationary switch contacts of the contact row B of the selector switch mechanism 13 and have been designated by the same reference characters, namely, the reference characters 81 to 88 inclusive. The stationary switch contacts 206 comprising the contact rows 81 to 88 are located on the support member 205 so as to be engageable, respectively, by the conducting elements of the control card 198 which constitute the horizontal contact rows 68 to 75 inclusive.

The stationary switch contacts 206 are mounted on the support member 205 in this grouped arrangement for engagement by the rows of conducting elements 68 to 75 inclusive by suitably shaped depending fingers 207 which are secured to the support member by rivets 208 extending through the latter. The stationary contacts 206 of each of the contact rows 81 to 88 inclusive are electrically connected together as by means of a bus bar 209 soldered, or otherwise electrically engaged, with the row of rivets 208 associated with that contact row.

The bus bars 209 of the contact rows 81 to 88 inclusive are connected with the terminals of the tube sockets 14 by appropriate conductors and, by way of illustration, the bus bars are shown in Fig. 16 as having conductors connected therewith which correspond with the conductors extending to the terminal pins of the 6SK7 tube 55 of the wiring diagram of Fig. 8. These conductors comprise the conductors 154, 156, 158, 160, 162, 164, 166 and 168 which are connected, respectively, with the bus bars 209 of the contact rows 81 to 88 inclusive.

From the description above given for the control card 198 and the selector switch mechanism 197, it will be seen that the insertion of this control card having conducting elements on one side only thereof in the guideway 203, will establish the various circuits desired for the testing of a 6SK7 tube inserted into the socket 14ᵃ.

The control card 198 is here shown as also having a power circuit control strip 107 thereon corresponding with the power circuit control strip of the control card 24 and which cooperates with the stationary switch contacts 80 and 91 for completing the power supply circuit when the control card 198 is fully inserted into the guideway 203. The control card 198 is also shown as having resistance devices 117 and 118 thereon corresponding with the resistance devices of the control card 24, although, if desired, these resistance devices can be omitted from the control card 198. The resistance devices 117 and 118 cooperate with stationary switch contacts 92, 93, 94, 95, 96 and 97.

Figure 21:
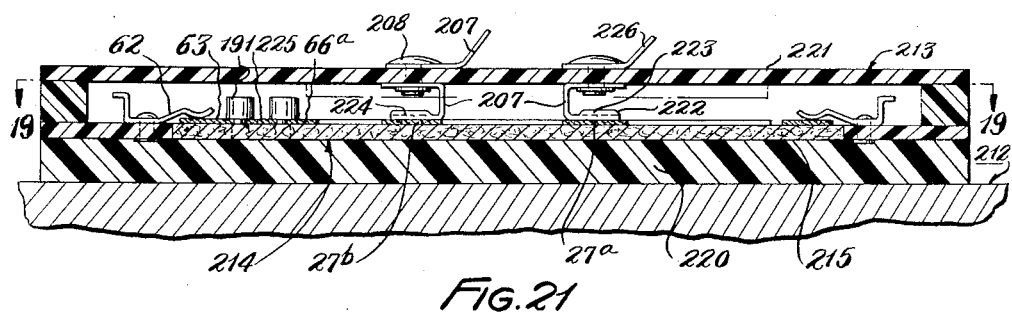
Fig. 21 is a larger scale partial transverse vertical section taken through the modified tube tester of Fig. 19 as indicated by section line 21—21 thereof.

Figs. 19 and 21 of the drawings show another modified form of tube tester 212 which includes a selector switch mechanism 213 and is generally similar to the above-described tube testers 10 and 196 in that it makes use of a control card 214 which is removably insertable into a guideway 215. The selector switch mechanism 213 differs from the above-described selector switch mechanisms 13, 181 and 197 in that the control card 214 used therein is a non-universal control card. The significance of the non-universal character of the control card 214 is that a control card having a different pattern of conducting elements thereon is used for each different type of electron tube to be tested. The control card 214 here shown carries conducting elements which are appropriate for the testing of a 6SK7 tube.

The conducting elements of non-universal control card 214 are all located on the upper surface of the card and are conducting elements of the printed circuit type which include two groups of conducting elements corresponding with the two groups of conducting elements carried by the control cards 24 and 198 and which groups have been designated by the same reference characters 27a and 27b. On the control card 214 these groups of conducting elements 27a and 27b are differently located and comprise substantially parallel longitudinally extending contact rows. The conducting elements of the control card 214 include connecting members in the form of conductor strips 219 which connect individual elements of one contact row with individual elements of the other contact row.

The conducting elements of the contact row 27a correspond with the horizontally extending rows of conducting elements of the control cards 24 and 198 and the individual elements have been designated by the corresponding reference characters 68 to 75 inclusive. Similarly, the conducting elements of the contact row 27b correspond with the longitudinally extending conductor strips of the control cards 24 and 198 and the individual elements have been designated by the same reference characters 101 to 106 inclusive.

Since the connections 219 extending between individual elements of the two contact rows 27a and 27b are represented as being for a 6SK7 tube, these connections have been designated by the same reference characters as have been used for the corresponding connections on the control cards 24 and 198, namely, the reference characters 129, 130, 131, 132, 133, 134 and 135.

Because the control card 214 is a non-universal card, these connecting members are in the form of the conducting strips 219 which are located on the card in a spaced-apart coplanar relation in an irregular pattern or maze. By using such mazes of specifically different patterns for the conducting strips 219, a set of control cards can be prepared which will be usable individually in the selector switch mechanism 213 for the corresponding different types of electron tubes to be tested. Thus when a 6SK7 tube is to be tested, the control card 214 is selected and inserted in the guideway 215, and when a tube of another identifying number is to be tested its corresponding control card is selected and inserted in the guideway.

The guideway 215 of the selector switch mechanism 213 is defined by base and support members 220 and 221, and the stationary switch contacts 222 corresponding with the contact groups B and C of the selector switch mechanism 13 are carried by the support member 221. These stationary contacts 222 comprise two contact rows 223 and 224 which are located on the cover member 221 in a substantially parallel relation extending longitudinally of the guideway 215 to correspond with the location of the conducting elements of the contact rows 27a and 27b of the control card 214.

The stationary switch contacts of the contact row 223 correspond with the stationary switch contacts of the contact row B of the selector switch mechanism 13 and have been designated by corresponding reference characters, namely, the reference characters 81 to 88 inclusive. The stationary switch contacts of the contact row 224 correspond with the stationary switch contacts of the contact row C of the selector switch mechanism 13 and have been designated by the same reference characters, namely, reference characters 110 to 116 inclusive.

The stationary switch contacts 222 are suitably mounted on the support member 221 as by means of the conducting resilient fingers 207, such that when the control card 214 is inserted into the guideway 215, the conducting elements of the contact rows 27a and 27b of the card will engage, respectively, the stationary contacts of the contact rows 223 and 224 to thereby select the test circuits desired for the testing of a 6SK7 tube. The fingers 207 are connected with the support member 221 by means of rivets 208 which also extend through the terminal members 226 and 227.

It will be understood that the terminal members 226 are connected with the terminals of the tube sockets 14 by conductors (not shown) corresponding with those shown in Fig. 8 as extending to the pins of the 6SK7 tube, namely, conductors 154, 156, 158, 160, 162, 164, 166 and 168. Likewise, the terminal members 227 have suitable test circuit conductors connected therewith (not shown) which correspond with the conductors 140, 142, 145, 147, 149 and 138 of Fig. 8.

The control card 214 is here shown as being also provided with conducting elements corresponding with the additional conducting elements carried by the control cards 24 and 198, such as the power circuit control strip 107, the conducting elements 63 constituting the contact row D, the L-shaped conducting strip 66, and a conducting strip 225 which corresponds with the conducting strip 100 of the card 24 and with the strip 202 of the card 198 but which comprises a straight narrow strip lying between the strip 66 and the contact row D. The control card 214 is also here shown as having resistance devices 117 and 118 thereon corresponding with the above-described resistance devices of the control card 24. On the control card 214, an extension portion 129 of the strip 225 connects this strip with the conducting elements 225a of the contact row 27b. This connection corresponds with the filament voltage supply connection 129 of the control card 24 and has been designated by this same reference character.

The selector switch mechanism 213 includes stationary switch contacts along the edges of the guideway 215 which correspond with certain of the stationary switch contacts of the selector switch devices 13 and 197 and have been designated by the same reference characters. Thus, the stationary switch contacts along the edge 30 comprise the contacts 62a, 62b and 63. The stationary switch contacts along the edge 31 comprise the power supply contacts 80 and 91 and the contacts 92 to 97 which are engageable by the resistance devices 117 and 118.

The resistance device 117 is provided on the control cards 198 and 214 is preferably somewhat different from the corresponding resistance device of the card 24 in that the lead strip 78 is located on the upper face of the card between the parallel portions of the resistance strip 117a. The connection 121 can be provided in the resistance device 117 of the control cards 198 and 214 by placing a drop of solder or a rivet at a location appropriate for the resistance values desired in the resistor legs 117b and 117c, or this connection can be formed by punching a hole in the card at the proper location and inserting one of the connectors 191 therein.

Figure 10:
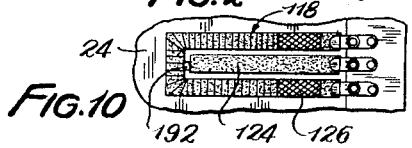
Fig. 10 is a fragmentary plan view corresponding with a portion of Fig. 3 but showing a modified construction for one of the resistance devices carried by the control card.
Figure 4:
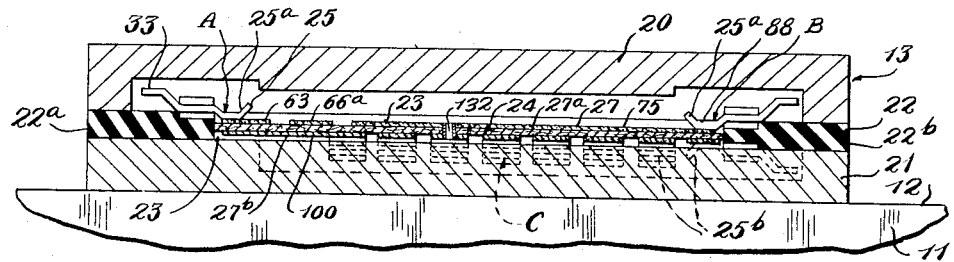
Fig. 4 is a partial transverse vertical section taken through the circuit selecting switch mechanism substantially as indicated by section line 4—4 of Fig. 2.

The resistance devices 118 on the control cards 198 and 214 can be identical with the corresponding resistor of the control card 24 in which the lead strip 124 has its inner end permanently connected with the intermediate portion of the resistance strip 118a, or can be of the modified form shown in Fig. 10 in which the inner end of the lead strip 124 is spaced from the intermediate portion of the resistance strip 118a. In the resistance device 118 of Fig. 10, the lead strip 124 can be connected with the intermediate portion of the resistance strip by employing a drop of solder or a rivet at this point or by punching one of the holes 192 in the card and inserting one of the connectors 191.

In the above-described tube testers 10, 180, 196 and 212, one or both of the resistance devices 117 and 118 can be omitted from the control card and located elsewhere in the tube tester if desired. Similarly, the voltage supply contacts of the contact row D can be omitted from the control card if desired. When the resistance devices 117 and 118 and the contacts of the contact row D are omitted from the control card, the stationary switch contacts which would be engageable by these omitted elements are, likewise, omitted from the selector switch mechanisms. When the resistance devices and the voltage supply contacts are omitted from the control cards and corresponding members are provided elsewhere in the tube tester, they are controlled by manually operable means similar to manually operable means now provided for similar purposes in existing tube testers. The omission of the resistance devices and the voltage supply contacts from the control cards may be desirable from the standpoint of simplifying the construction of the cards. When the voltage supply contacts are replaced by such a manual control for the voltage supply, the voltage can be increased or decreased while the control circuits are being maintained, as is sometimes desirable. Such a manually adjustable control is indicated at 230 in the wiring diagram of Fig. 8.

From the accompanying drawings and the foregoing detailed description, it will now be readily understood that this invention provides a new and improved tester for electron tubes in which a control card removably inserted in a guideway and having conducting elements of the printed circuit type thereon, cooperates with stationary switch contacts for selecting and establishing substantially all of the circuits needed for carrying out the desired tests on an electron tube which has been inserted into a test socket of the apparatus. It will now also be seen that by using a control card having conducting elements thereon which include at least two groups of contact elements, circuit crossovers can be readily obtained in the selector switch device of the tube tester, such that a control card corresponding with a particular type of electron tube to be tested will satisfactorily establish substantially all of the power and test circuits needed in the testing of that particular type of tube. Likewise, it will be seen that the invention provides a novel form of tube tester and control card in which conducting elements of the printed circuit type are located on one or both sides of the card, and in which the card can be either a universal card adaptable to different types of tubes or a nonuniversal card corresponding with a particular type of tube. Additionally, it will be seen that this invention provides such a novel tube tester and circuit control means in which a resistance device, such as a resistance of variable resistance value or a center-tapped resistor, is mounted on the control card and carried thereby.

Although the tube tester of the present invention and the selector switch and circuit control card thereof have been illustrated and described herein to a somewhat detailed extent, it will be understood, of course, that the invention is not to be regarded as being limited correspondingly in scope, but includes all changes and modifications coming within the terms of the claims hereof. It will likewise be recognized that although the testing apparatus and the device to be tested are referred to in the specification and claims hereof as being respectively a tube tester and a tube, the apparatus is applicable to the testing of various detachable-unit type of electrical components and, accordingly, the term "tube" as used herein includes such detachable-unit components in general.

Having thus described my invention, I claim:

1. In a tube tester, socket means having a plurality of terminals and adapted to receive a tube to be tested, power supply means, an indicator, a support structure having portions defining a channel-like guideway and including first support portions extending along edge portions of the guideway, other support means on said structure and extending in bridging relation to the guideway, circuit means for use in connecting certain of said terminals and said indicator with said power supply means in selected circuits and including switch contacts adjacent said guideway, said contacts comprising a first group of contacts on said first support portions and another group of contacts on said other support means, a control card movable in said guideway, and electrically conductive elements on said card and engageable with contacts of said first group and with contacts of said other group for inclusion in said selected circuits.

2. In a tube tester; socket means having a plurality of terminals and adapted to receive tubes of different types; power supply means; an indicator; a support structure having portions defining a channel-like guideway and including first support portions extending along edge portions of the guideway; other support means on said structure and extending in bridging relation to the guideway; a plurality of switch contacts adjacent said guideway; said contacts comprising a first group of contacts on said first support portions and another group of contacts on said other support means; and means for connecting certain of said terminals and said indicator with said power supply means in selected circuits suitable for a particular type of tube being tested and which include contacts of said first group and also include contacts of said other group; the last-mentioned means comprising a control card removably disposed in said guideway, and electrically conductive elements of the printed circuit type on one side of said card in a positioning determined by the characteristics of said particular type of tube and engageable with said switch contacts for completing said selected circuits.

3. In a tube tester, socket means having a plurality of terminals and adapted to receive a tube to be tested, power supply means, an indicator, a support structure having portions defining a guideway and including first support portions extending along edge portions of the guideway, other support means on said structure and extending in bridging relation to said guideway, circuit means for use in connecting certain of said terminals and said indicator with said power supply means in selected circuits and including a first group of switch contacts located on said first support portions and another group of switch contacts on said other support means and comprising spaced rows of spaced contacts, the spaced contacts of each such row being electrically connected together by portions of said circuit means, a control card removably disposed in said guideway, electrically conductive elements on said card and engageable with said switch contacts for inclusion in said selected circuits, the elements of said card comprising spaced strips engageable with switch contacts of one of said groups and rows of spaced elements between said strips and engageable with switch contacts of said other group.

4. In a tube tester, socket means having a plurality of terminals and adapted to receive a tube to be tested, power supply means, an indicator, means defining a guideway and including first support means extending adjacent said guideway, other support means in a bridging relation to the guideway, circuit means for use in connecting certain of said terminals and said indicator with said power supply means in selected circuits and including switch contacts located within the plan area of said switch contacts comprising a first group of contacts on said first support means and another group of contacts on said other support means, a control card removably disposed in said guideway, two groups of electrically conductive elements of the printed circuit type on said card engageable with the respective groups of said switch contacts for inclusion in said selected circuits, and junction elements applied to the card and connecting certain elements of the two said groups of elements.

5. In a tube tester, socket means having a plurality of terminals and adapted to receive a tube to be tested, power supply means, an indicator, means defining a guideway and including first support means extending along edge portions of the guideway, other support means extending substantially parallel to the plane of said guideway and in bridging relation to the guideway; circuit means for use in connecting certain of said terminals and said indicator with said power supply means in selected circuits and including a first group of switch contacts on said first support means and disposed in spaced-apart relation along edge portions of said guideway and another group of switch contacts located within the plan area of said guideway and carried by said other support means, a control card removably disposed in said guideway, contact elements on said card including first contact elements adjacent edge portions of the card and engageable with said first switch contacts and other contact elements lying within the plan area of the card and engageable with said other switch contacts, and conducting means carried by said card and forming circuit connections extending between and connecting certain of said contact elements.

6. In a tube tester, socket means having a plurality of terminals and adapted to receive a tube to be tested, power supply means, an indicator, means defining a guideway and including a first support means extending along edge portions of the guideway and other support means extending in bridging relation to said guideway, circuit means for use in connecting certain of said terminals and said indicator with said power supply means in selected circuits and including a first group of spaced-apart switch contacts located on said first support means and another group of switch contacts in a predetermined pattern within the plan area of said guideway and carried by said other support means, a control card removably disposed in said guideway, spaced-apart contact elements carried by said card and engaging switch contacts of said first group, other contact elements on said card and disposed in said predetermined pattern for engagement with said other group of switch contacts, and conductor means on said card and forming circuit connections extending between and connecting certain of said contact elements.

7. A tube tester as defined in claim 6 in which the switch contacts of said other group are located in spaced rows and in which said other contact elements are located in similar spaced rows.

8. A tube tester as dfined in claim 6 in which the switch contacts of said other group are located in spaced rows and said other contact elements are located in similar spaced rows, and in which said conductor means comprises a maze of spaced-apart substantially coplanar conductors of the printed circuit type connecting certain contact elements of one row with certain contact elements of another row.

9. In a tube tester, socket means having a plurality of terminals and adapted to receive a tube to be tested, power supply means, an indicator, support means defining a guideway and including a first support means extending along edge portions of the guideway and other support means extending in bridging relation to said guideway, circuit means for use in connecting certain of said terminals and said indicator with said power supply means in selected circuits and including spaced rows of spaced-apart first switch contacts located within the plan area of said guideway and carried by said other support means, other switch contacts on said first support means and aligned with the spaces between the rows of said first switch contacts, a control card removably disposed in said guideway, spaced rows of spaced-apart contact elements on said card and engageable with said first switch contacts, and contact strips on said card between the rows of said contact elements and engageable with said other switch contacts, certain of said contact elements being electrically connected with certain of said contact strips.

10. In a tube tester, socket means having a plurality of terminals and adapted to receive a tube to be tested, power supply means, an indicator, support means defining a guideway and including a first support means extending along edge portions of the guideway and a second support means extending in bridging relation to the guideway. Circuit means for use in connecting certain of said terminals and said indicator with said power supply means in selected circuits and including switch contacts located on said first and second support means, a control card movable in said guideway, contact elements on said card and engageable with said switch contacts for inclusion in said selected circuits, said contact elements comprising contact groups disposed with contact elements of one group adjacent contact elements of another group, said card having openings therein located such that conducting means disposed in said openings will connect contact elements of one of said contact groups with contact elements of another of said contact groups, and conducting means disposed in certain of said openings.

11. A tube tester as defined in claim 10 in which the contact elements of said contact groups are all on one side only of said card.

12. A tube tester as defined in claim 10 in which the adjacent contact elements of different contact groups are on the same side of said card, and in which said openings span the spaces between said adjacent contact elements.

13. A tube tester as defined in claim 10 in which the contact elements of one contact group comprise rows of spaced-apart contact elements and the contact elements of another contact group comprise contact strips extending along said rows, and in which said openings span the spaces between contact elements of said rows and the adjacent contact strips.

14. A tube tester as defined in claim 10 in which said conducting means comprises stems removably engaged in said openings.

15. In a tube tester, socket means having a plurality of terminals and adapted to receive tubes of different types, power supply means, an indicator, means defining a guideway, circuit means for use in connecting certain of said terminals and said indicator with said power supply means in selected circuits and including switch contacts adjacent said guideway, circuit selecting and completing means comprising a control card having conductive elements thereon including contact groups disposed with contact elementss of one contact group adjacent contact elements of another contact group, said conductive elements constituting a universal pattern determined by the characteristics of a substantial number of the different types of said tubes, and conducting means carried by the card and connecting certain of the contact elements of one contact group with certain of the contact elements of another of the contact groups for converting said universal pattern to a pattern characteristic of a given one of the different tube types, said card being movable to a predetermined control position in said guideway for engaging certain of said contact elements with certain of said switch contacts.

16. In a tube tester, socket means having terminals and adapted to receive tubes of different types, power supply means, an indicating meter, a guideway, circuit means for use in connecting certain of said terminals and said meter with said power supply means in selected circuits including switch contacts adjacent said guideway, a control card movable in said guideway, and circuit selecting conductive elements on said card and engageable with said switch contacts including resistor means also on said card and constituting a meter shunt.

17. A tube tester as defined in claim 16 in which said resistor means is a conductive strip whose ends constitute terminal members located adjacent the edge of said card.

18. In a tube tester, socket means having terminals and adapted to receive tubes of different types, power supply means, an indicating meter, a guideway, circuit means for use in connecting certain of said terminals and said meter with said power supply means in selected circuits including switch contacts adjacent said guideway, a control card movable in said guideway, circuit selecting conductive elements on said card and engageable with certain of said switch contacts, and other conductive elements on said card comprising a resistor constituting a meter shunt and a center tap for said resistor, said resistor and center tap having terminal portions engageable with certain of said switch contacts.

19. A tube tester as defined in claim 18 in which said resistor comprises a substantially U-shaped conductive strip, and in which the ends of said strip and the outer end of said tap constitute a row of terminal members located adjacent an edge of the card.

20. In a tube tester, socket means having terminals and adapted to receive tubes of different types, power supply means, an indicating meter, a guideway, circuit means for use in connecting certain of said terminals and said meter with said power supply means in selected circuits including switch contacts adjacent said guideway, a control card movable in said guideway, circuit selecting conductive elements on said card and engageable with certain of said switch contacts including a bias resistor and a resistor lead coextensive with a portion of said bias resistor, and conducting means carried by said card and connecting said resistor lead with said bias resistor at a desired point of the latter.

21. A tube tester as defined in claim 20 in which said bias resistor comprises conductive strip means having spaced arm portions and in which said resistor lead lies between said arm portions.

References Cited in the file of this patent

UNITED STATES PATENTS

| | | |
|---|---|---|
| 2,002,425 | Williams | May 21, 1935 |
| 2,198,503 | Morrison | Apr. 23, 1940 |
| 2,264,066 | Buchard | Nov. 25, 1941 |
| 2,611,010 | Sass | Sept. 16, 1952 |
| 2,683,839 | Beck | July 13, 1954 |
| 2,731,609 | Sobel | Jan. 17, 1956 |

FOREIGN PATENTS

| | | |
|---|---|---|
| 709,317 | Germany | Aug. 13, 1941 |
| 424,714 | Italy | Aug. 28, 1947 |
| 891,578 | Germany | Sept. 28, 1953 |